W. E. SKINNER.
Butter Worker.
No. 64,803.
Patented May 14, 1867.
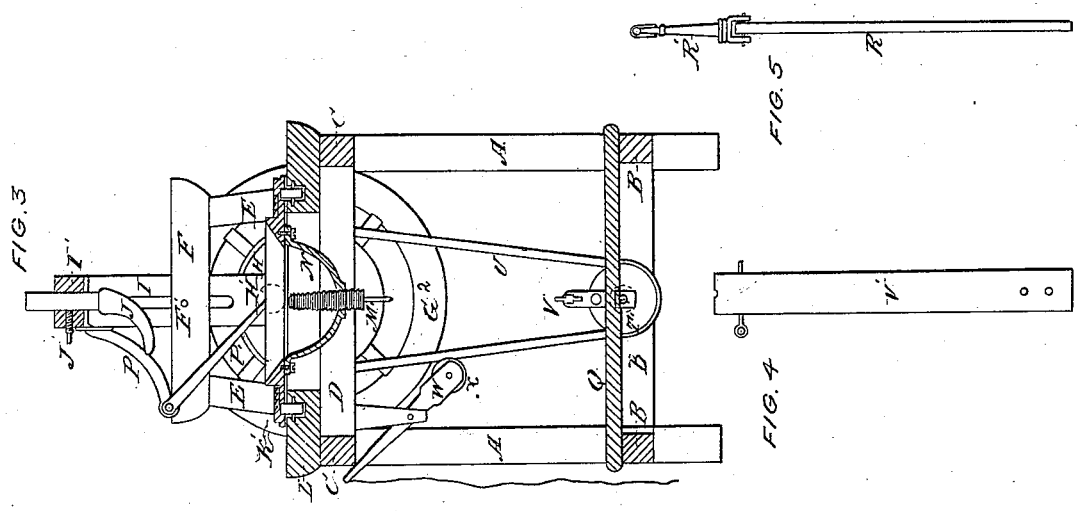
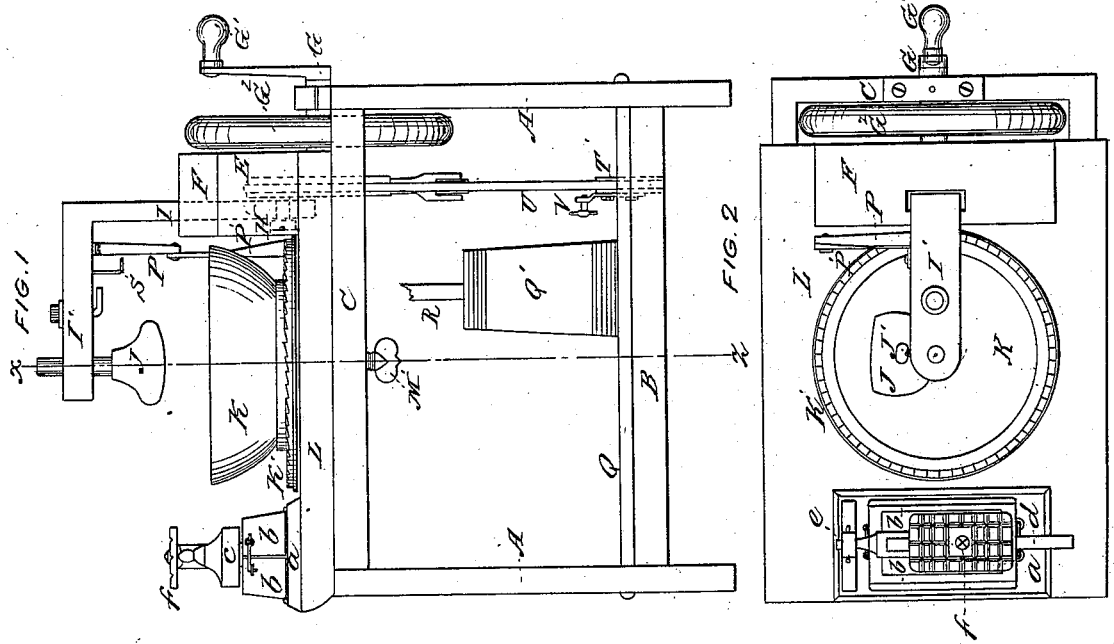
WITNESSES:
INVENTOR:

United States Patent Office.

WILLIAM E. SKINNER, OF MILFORD, MICHIGAN.

Letters Patent No. 64,803, dated May 14, 1867.

BUTTER-WORKER.

The Schedule referred to in these Letters Patent and making part of the same.

TO ALL WHOM IT MAY CONCERN:

Be it known that I, WILLIAM E. SKINNER, of Milford, Oakland county, State of Michigan, have invented certain new and useful improvements in Butter-Workers and presses for pressing butter; and I do hereby declare the following description and accompanying drawings are sufficient to enable any person skilled in the art or science to which it most nearly appertains to make and use my said invention or improvements without further invention or experiment.

The nature of my invention consists in certain improvements for giving the paddle that works the butter a compound motion in imitation of the motion given to the paddle by dairy-women; also in making the butter-bowl to rotate, and bring the different portions of butter in succession under the paddle to be worked; also in providing a press with movable sides hinged to the base to press the butter into cakes or rolls after it is worked; and in providing the press-box with a traversing follower to press the butter into the box. In the accompanying drawings—

Figure 1 is an elevation of a machine with my improvements.

Figure 2 is a plan or top view.

Figure 3 is a section on the line $zz$ of fig. 1.

In these drawings, A A are the posts of the frame connected near their lower ends by the girders B B, and at the top by the rails C C, making a strong oblong rectangular frame, to which the other parts of the machine are either fastened or connected. The top bar D is framed into the rails C near one end of the frame to support the two standards E E which hold the cap-bar F, as shown in the drawing. G is a shaft turning in journal-boxes fastened to the rail C and bar D, and provided with a hand-crank, $G^1$, to turn it. The fly-wheel $G^2$ is fastened to the shaft G to equalize the motion of the machine when working. The pulley H is fastened to the opposite end of the shaft G from the crank $G^1$, and has the wrist-pin $H'$ in it, to work the vibrating traversing bar I, which works up through a mortise in the cap-bar F, and is guided by the pin $F'$ in the bar, which passes through a long slot in the bar I, giving the bar I as it is traversed by the wrist-pin a peculiar compound motion. This traversing bar I has the horizontal arm $I'$ firmly fastened to its upper end, as shown in the drawing, to carry the paddle J, to work the butter in the bowl under the paddle, which is provided with a shank passing through the arm $I'$, and fastened by the set-screw $J'$ when adjusted in the desired position. The paddle J may be made in the form shown, or in such other form as will answer the purpose to work the butter in the bowl to advantage. The butter-bowl K may be made in the form shown and set on the annular plate $K'$, which is fitted to receive it, and arranged to turn on the platform L fastened to the rails C C. This platform L has a large hole in it under the plate $K'$, and the bent bar M is fastened to the under side of the plate $K'$, and provided with a screw, $M'$, which screws into a female screw fastened to the bottom of the bowl K, to hold it firmly on the plate $K'$, which has a goove in the under side fitted to four friction-rollers which are arranged to turn in the platform L, to support the plate $K'$ and bowl as they are turned under the paddle to work the butter. To turn the plate $K'$, I fasten the arm P to the arm $I'$, and pivot the pawl $P'$ to its lower end, which pawl acts on the ratchet-teeth on the plate $K'$ and turns it with the bowl K, when the bar I is traversed to carry the paddle and work the butter. The machine may be stopped occasionally and the buttermilk poured from the bowl, or the bowl may have a pipe in the bottom with a valve or trap-door in the bowl to let the buttermilk run off. The lower platform Q is fastened to the girders B B, and when the machine is wanted to operate the churn, the churn-barrel $Q'$ is set on the platform Q, and the dasher-pole R, fig. 5, is put through a hole in the plate $K'$, the pawl $P'$ being previously raised and fastened up by the hook S, to let the plate remain at rest, and the bowl K removed from the plate so as to be out of the way of the dasher-pole, which is connected to the arm $I'$ by the pitman $R'$, so as to work the dasher and churn the butter by the arm $I'$. With this machine the common upright stone jar or barrel may be used to churn in. The shaft T is arranged to turn in journal-boxes supported by the girders B B, and has the pulley $T'$ fastened to it which is turned by the band U from the pulley H. The pulley T has the wrist-pin V fastened to it, so that when it is desirous to work the churn-dasher fast without increasing the speed of the fly-wheel, the wrist-pin $H'$ can be taken out of the pulley H, and the extension bar $V'$, fig. 4, inserted in the socket in the lower end of the transverse bar I and fastened with a pin, and the wrist-pin V is put through bar $V'$, when, as the pulley H is twice as large as the pulley $T'$, the churn dasher will be worked much faster without increasing the speed of the fly-wheel, and by these means the butter may be churned very quick.

To press the butter into rolls or cakes, I make a press-box with a base, *a*, that may be fastened to the platform L, and make the sides of the press-box in the form shown in the drawing, with one-half of each end joined to each side, and hinge the sides *b b* to the base *a*, and put a hook and staples at each end to hold the sides together, while the butter is being pressed in by the follower *c* on the lever *d*, which is hung on a pin in the standard *e* fastened to the base *a*, so that the lever may be worked by hand to press the butter into the box. The lever *d* has a long slot in it for the shank of the follower *c* to traverse in, so as to press the butter from end to end in the box. And if it is desirable to print the rolls of butter, the lever *d* may be turned over and the butter printed by the platen *f*. After the butter has been pressed into a roll the hooks at the ends of the press-box may be unhitched and the sides turned down and the roll of butter removed. Should it be found necessary or desirable the base *a* may be grooved a little wider than the inside of the box and a flat board laid in to fill the groove, so that when the butter is pressed into the box on the board, and the box opened, the butter may be removed by taking up the board. The lever W is hung to the frame to carry the tightening pulley X, which is pivoted in the lever to act against the band U, and tighten it when the machine is in operation. The base of the press may have a groove around it to convey away any buttermilk that may escape from the press.

Although I have described my machine as a butter-worker, I contemplate that it will be useful and desirable for working or kneading dough for bread, clay for pottery-ware, putty, and other compositions.

I claim giving the paddle of the butter-worker a compound motion in imitation of the motion given to the paddle by a dairy-woman, substantially as set forth by the devices described or their equivalents.

And in combination with the paddle having the compound motion above claimed, I claim giving the butter-bowl a rotary motion, substantially as described.

In combination with the butter-worker, I claim the press-box with movable sides hinged to its base, substantially as described.

And in combination with the press-box above claimed, I claim the traversing follower, substantially as described.

WILLIAM E. SKINNER.

Witnesses:
GEORGE P. BOOTH,
CHARLES T. RILEY,
PHILIP F. WELLS.